(12) United States Patent
Zhang et al.

(10) Patent No.: US 12,023,717 B2
(45) Date of Patent: Jul. 2, 2024

(54) CLEANING ROLLER DEVICE

(71) Applicant: Shaoxing Fengdeng Environmental Protection Co., Ltd., Shaoxing (CN)

(72) Inventors: Lei Zhang, Shaoxing (CN); Xin Chen, Shaoxing (CN); Bin Han, Shaoxing (CN); Shengwei Yao, Shaoxing (CN); Jiangming Lv, Shaoxing (CN); He Yang, Shaoxing (CN)

(73) Assignee: Shaoxing Fengdeng Environmental Protection Co., Ltd., Shaoxing (CN)

( * ) Notice: Subject to any disclaimer, the term of this patent is extended or adjusted under 35 U.S.C. 154(b) by 96 days.

(21) Appl. No.: 17/662,416

(22) Filed: May 6, 2022

(65) Prior Publication Data
US 2022/0395868 A1 Dec. 15, 2022

(30) Foreign Application Priority Data
Jun. 13, 2021 (CN) .......................... 202110657579.9

(51) Int. Cl.
*D06F 3/04* (2006.01)
*B08B 3/04* (2006.01)
*B08B 3/10* (2006.01)

(52) U.S. Cl.
CPC ............... *B08B 3/044* (2013.01); *B08B 3/10* (2013.01)

(58) Field of Classification Search
CPC .................................. B08B 3/044; B08B 9/02
See application file for complete search history.

(56) References Cited

U.S. PATENT DOCUMENTS

| | | | | |
|---|---|---|---|---|
| 5,092,357 A | * | 3/1992 | Chapman | B08B 9/023 134/172 |
| 8,061,296 B1 | * | 11/2011 | Batur | B24C 3/325 118/317 |
| 9,415,426 B1 | * | 8/2016 | Blake | B08B 3/024 |

* cited by examiner

*Primary Examiner* — Joseph L. Perrin
*Assistant Examiner* — Kevin G Lee
(74) *Attorney, Agent, or Firm* — Culhane Meadows PLLC; Robert C. Klinger

(57) ABSTRACT

A cleaning roller device is provided. The cleaning roller device comprises a transversely-arranged cleaning roller, a roller bearing device, and a roller driving device capable of driving the cleaning roller to rotate around the central axis of the cleaning roller on the roller bearing device, wherein a front-end central pipe and a rear-end central pipe are respectively arranged along the front-end central axis and the rear-end central axis of the cleaning roller and are respectively connected to rotary joints. The rotary joints are used for respectively connecting external pipelines communicated with a water source and a steam source; the front end of the cleaning roller is provided with a solid barrel fragment outlet and a barrel fragment outlet sealing cover, and the rear end of the cleaning roller is provided with a liquid outlet; a feed port is formed in the wall of the cleaning roller.

8 Claims, 7 Drawing Sheets

CLEANING ROLLER DEVICE

CROSS REFERENCE TO RELATED APPLICATION(S)

This patent application claims the benefit and priority of Chinese Patent Application No. 202110657579.9, filed on Jun. 13, 2021, the disclosure of which is incorporated by reference herein in its entirety as part of the present application.

TECHNICAL FIELD

The present disclosure belongs to the technical field of hazardous waste treatment, and relates to a cleaning roller device which is used as a main component of a barreled viscous colloidal hazardous waste treatment and recovery system to separate viscous colloidal hazardous waste from shredded material barrel fragments and to homogenize the viscous colloidal hazardous waste into a liquid chemical raw material.

BACKGROUND ART

After being industrially processed, organic matters such as saccharides and starch or petroleum and chemical raw materials are extremely high in viscosity, and can quickly agglomerate into colloid which is difficult to separate after being taken off the machine. Such situation is ubiquitous in petroleum, chemical engineering, pharmaceutical, and leather industries. This viscous colloidal hazardous waste is shaped like sludge, and thus it is also called sludge.

For example, the reason for serious pollution caused by chemical synthesis pharmaceutical technology is long in synthesis process and multiple in reaction steps, extracts in each procedure only account for a small amount of raw material consumption, usually only a few percentage points, while auxiliary raw materials and the like account for the vast majority of the raw material consumption; most of the raw materials are converted into three wastes, thus leading to large in output of three waste, complex in waste component and serious in pollution hazard. As the raw materials for chemical synthesis pharmaceutical technology are mainly organic matters such as saccharides and starch, heating is required in multiple procedures, thus the hazardous wastes discharged from the machine are extremely high in viscosity and can quickly and automatically agglomerate into colloid and are difficult to separate, and the treatment difficulty of such high-viscosity colloidal hazardous wastes is increased. A large amount of such high-viscosity colloidal hazardous wastes can also be generated in the leather making industry.

At present, such high-viscosity colloidal hazardous waste is contained in a disposable iron sheet material barrel or a plastic material barrel, generally a standard material barrel with the volume of 200 L, and then is conveyed to a hazardous waste treatment place to be treated in a unified mode. At present, there is no good way for hazardous waste treatment sites, only the way of manually dividing the sludge mass together with the material barrel into pieces by cutting and impacting by using a simple traditional tool, and then smashing the blocks respectively can be adopted, which is time-consuming and labor-intensive, dirty, and smelly in place for treatment, harsh in working environment, high in treatment cost, and poor in treatment effect. Therefore, hazardous waste treatment is a major technical problem in the pharmaceutical industry and sewage sludge treatment industry at present, as the lack of effective treatment technology, incompletely treated hazardous waste not only has an adverse effect on the environment, but also lead to social conflicts. Therefore, the treatment of the high-viscosity colloidal hazardous waste is a major social problem which is concerned by various levels of governments and even whole society scheduling and urgent to be solved.

The key for treating such high-viscosity colloidal hazardous waste is to separate the viscous colloidal hazardous waste from the material barrel fragments, and homogenize the viscous colloidal hazardous waste into liquid, thus the liquid can be conveniently conveyed by a pump and can be used as the chemical raw material for use. Therefore, separating the viscous colloidal hazardous waste from the material barrel fragments and homogenizing the viscous colloidal hazardous waste into the liquid are the key for the barreled viscous colloidal hazardous waste treatment and recovery technology.

To this end, an applicant of the present disclosure develops a barreled viscous colloidal hazardous waste treatment and recovery system device, and provides a patent application entitled "Barreled Viscous Colloidal Hazardous Waste Treatment and Recovery System Device" on the same day as the present disclosure. The cleaning roller device provided by the present disclosure is used as a main component of the barreled viscous colloidal hazardous waste treatment and recovery system.

SUMMARY

The technical problem to be solved by the present disclosure is to provide a cleaning roller device used as a main component of a barreled viscous colloidal hazardous waste treatment and recovery system for the technical states.

The technical solution adopted by the present disclosure for solving the technical problem is as follows:

a cleaning roller device is used as a main component of a barreled viscous colloidal hazardous waste treatment and recovery system to separate viscous colloidal hazardous waste from shredded material barrel fragments and to homogenize the viscous colloidal hazardous waste into a liquid chemical raw material, wherein the cleaning roller device comprises a transversely-arranged cleaning roller, a roller bearing device, and a roller driving device capable of driving the cleaning roller to rotate around the central axis of the cleaning roller on the roller bearing device; a front-end central pipe and a rear-end central pipe are respectively arranged along the front-end central axis and the rear-end central axis of the cleaning roller and are respectively connected to rotary joints. The rotary joints are used for respectively connecting external pipelines communicated with a water source and a steam source; the front end of the cleaning roller is provided with a solid barrel fragment outlet and a barrel fragment outlet sealing cover, and the rear end of the cleaning roller is provided with a liquid outlet; a feed port is formed in the wall of the cleaning roller and is provided with a feed port sealing cover.

The following is the further solution of the present disclosure:

an inner-ring cylindrical filter plate which is coaxial with the inner wall of the cleaning roller is arranged in the cleaning roller, the length of the inner-ring cylindrical filter plate is arranged along the whole length of an inner cavity of the cleaning roller, a spacing distance of 80 mm-120 mm is reserved between the inner-ring cylindrical filter plate and the inner wall of the cleaning roller, and drain holes are uniformly formed in the inner-ring cylindrical filter plate.

Steel balls are arranged in an annular space between the inner wall of the cleaning roller and the inner-ring cylindrical filter plate, and the steel balls can roll freely along the inner wall of the cleaning roller; when the cleaning roller is a static state, the steel balls fall into the bottom of the inner wall of the cleaning roller and are arranged in rows along the length of the roller, and at least two rows of the steel balls are provided, specifically two rows or three rows or four rows; and when the cleaning roller is in a rotating state, a collision relationship is formed between two adjacent steel balls between adjacent steel ball rows.

A wave making plate is arranged at the inner wall of the cleaning roller, and the wave making plate penetrates through the inner-ring cylindrical filter plate from the inner wall of the cleaning roller in the radius direction or the inclined direction to extend to the inner cavity. Three to eight wave making plates are uniformly arranged along the circumferential direction of the inner wall of the cleaning roller at intervals, and extend out from the inner wall of the cleaning roller along the radius direction or the inclined direction with an extending length of 100 mm to 350 mm; and the lengths of the wave making plates are arranged continuously or arranged at intervals along the whole length of the inner cavity of the cleaning roller.

The roller bearing device is arranged as follows: at least two large supporting wheels surrounding the outer wall of the roller are arranged at the outer wall of the roller at intervals, small supporting wheels capable of supporting the large supporting wheel are symmetrically arranged at both sides of each large supporting wheel, and each small supporting wheel is supported by a pair of bearings 29 which are symmetrically fixed to the ground; and the roller driving device comprises a motor, a stop brake, a reduction gear box, a pinion, and a gear wheel in turn; the gear wheel is fixed to the outer wall of the barrel, and the pinion is supported by a pair of bearings symmetrically fixed to the ground.

The cleaning roller device provided by the present disclosure can thoroughly separate the viscous colloidal hazardous waste from barrel fragments and homogenize the viscous colloidal hazardous waste into liquid, thus the liquid can be conveyed by a pump conveniently and can be used as a liquid chemical raw material. In accordance with the cleaning roller device provided by the present disclosure, the cleaning roller is transversely arranged by using the roller bearing device, and the roller driving device is used for driving the cleaning roller to rotate around the central axis thereof on the roller bearing device. The front-end central pipe and the rear-end central pipe are respectively arranged along the front-end central axis and the rear-end central axis of the cleaning roller and are respectively connected to rotary joints, and whether in a static state or a rotating state, the front-end central pipe and the rear-end central pipe can be respectively connected to external pipelines communicated with a water source and a steam source by using the rotary joints. The front end of the cleaning roller is provided with a solid barrel fragment outlet and a barrel fragment outlet sealing cover to facilitate the discharge of the material barrel fragments. The rear end of the cleaning roller is provided with a liquid outlet to facilitate the discharge of the treated liquid chemical raw material. A feed port is formed in the wall of the cleaning roller, and the feed port is provided with a feed port sealing cover; during feeding, the feed port is in butt joint with a shredder outlet above for feeding conveniently; after the feeding is finished, the feed port is sealed by the sealing cover to disconnect from the shredder outlet, then rolling cleaning can be conducted by introducing the water and steam, and moreover, when the cleaning roller is in rolling cleaning, the water and steam can still be introduced as required by using the rotary joints.

In addition, by arranging the wave making plate, the wave washing effect of the liquid of the washing roller can be enhanced, thus enhancing the washing effect of the material barrel fragments. By arranging the steel balls in the annular space between the inner wall of the cleaning roller and the inner-ring cylindrical filter plate, the colloidal hazardous waste with extremely high viscosity can also be thoroughly homogenized into an ideal liquid chemical raw material.

The barreled viscous colloidal hazardous waste treatment and recovery system device taking the cleaning roller device of the present disclosure as the main component can cleanly and thoroughly treat the viscous colloidal hazardous waste to eliminate the pollution of the viscous colloidal hazardous waste to the environment and completely utilize the viscous colloidal hazardous waste. The barreled viscous colloidal hazardous waste treatment and recovery system device taking the cleaning roller device of the present disclosure as the main component is high in automation degree, only requires two to three skilled operators for one work shift; and the cleaning roller device is high in working efficiency, in a case that 4 $m^3$ of viscous colloidal hazardous waste can be treated in once charge, 20 $m^3$ of viscous colloidal hazardous waste can be treated in one work shift.

Figure 1:
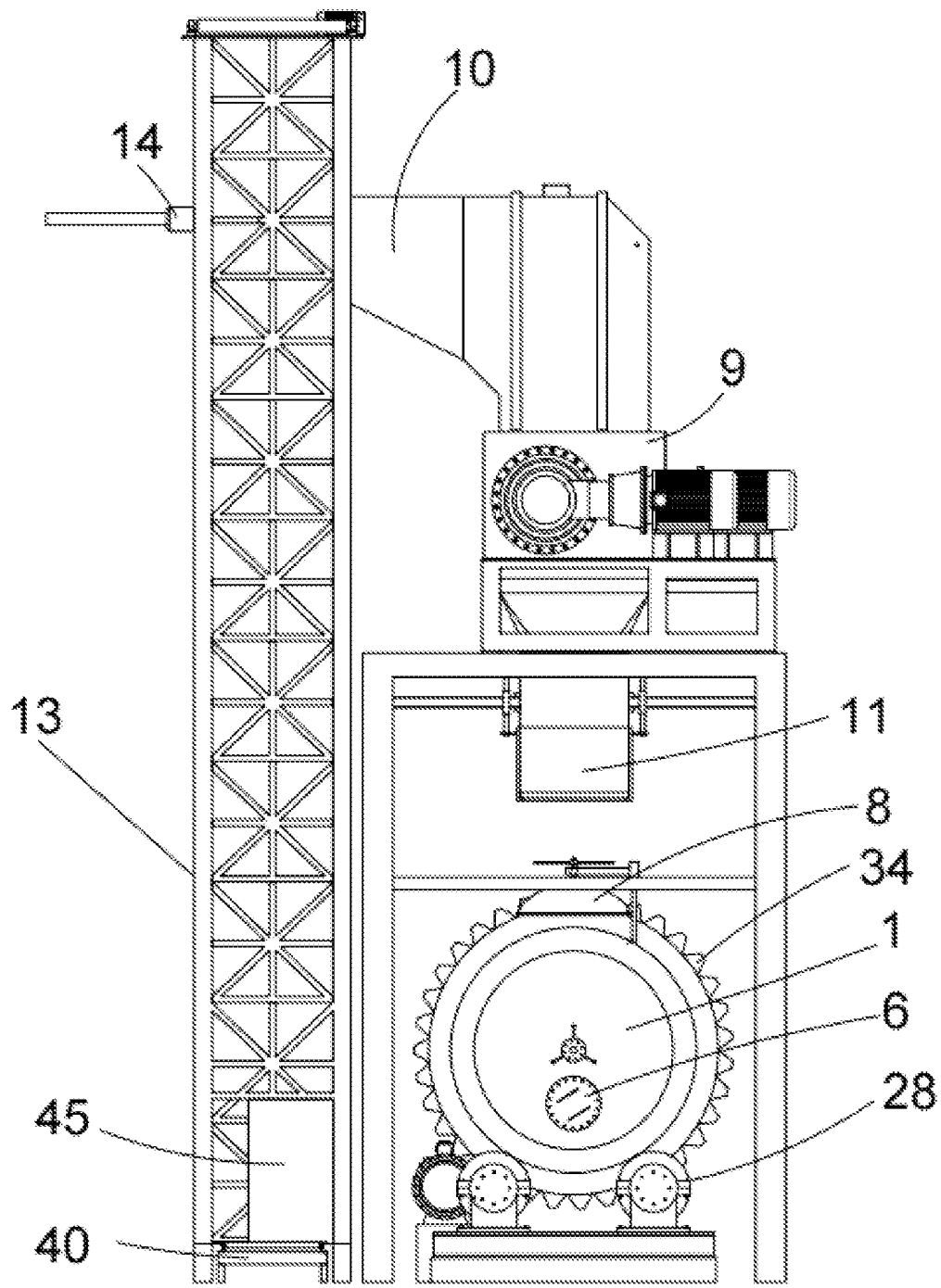
FIG. 1 is a diagram of the front end of a barreled viscous colloidal hazardous waste treatment and recovery system device taking a cleaning roller device of the present disclosure as a main component.

Parts indicated by reference numerals in the drawings: 1—cleaning roller; 2—front-end central pipe; 3—rear-end central pipe; 4—rotary joint; 5—external pipeline; 6—barrel fragment outlet sealing cover; 7—liquid outlet; 8—feed port sealing cover; 9—shredder; 10—barrel inlet; 11—detachable connecting pipe; 12—water mist spraying device; 13—material barrel lifting device; 14—barrel pushing device; 15—inner-ring cylindrical filter plate; 16—wave making plate; 17—gauge tank; 18—water valve; 19—water level gauge; 20—water channel for water mist spraying; 21—water pump; 22—steam valve; 23—overpressure control valve; 24—pressure relief valve; 25—nitrogen adding control valve; 26—overtemperature control valve; 27—large supporting wheel; 28—small supporting wheel; 29—bearing; 30—motor; 31—stop brake; 32—reduction gear box; 33—pinion; 34—gear wheel; 35—guide pillar;

36—guide sleeve; 37—push plate; 38—hydraulic cylinder; 39—piston rod; 40—rolling conveying device; 41—steel rail; 42—rolling wheel; 43—liquid transfer pump; 44—liquid storage tank; 45—material barrel; 46—top plate; 47—spray nozzle; 48—stirrer; 49—steel ball.

DETAILED DESCRIPTION OF THE EMBODIMENTS

Specific embodiments of the present disclosure are described below shown in FIG. 1 to FIG. 11.

Figure 6:
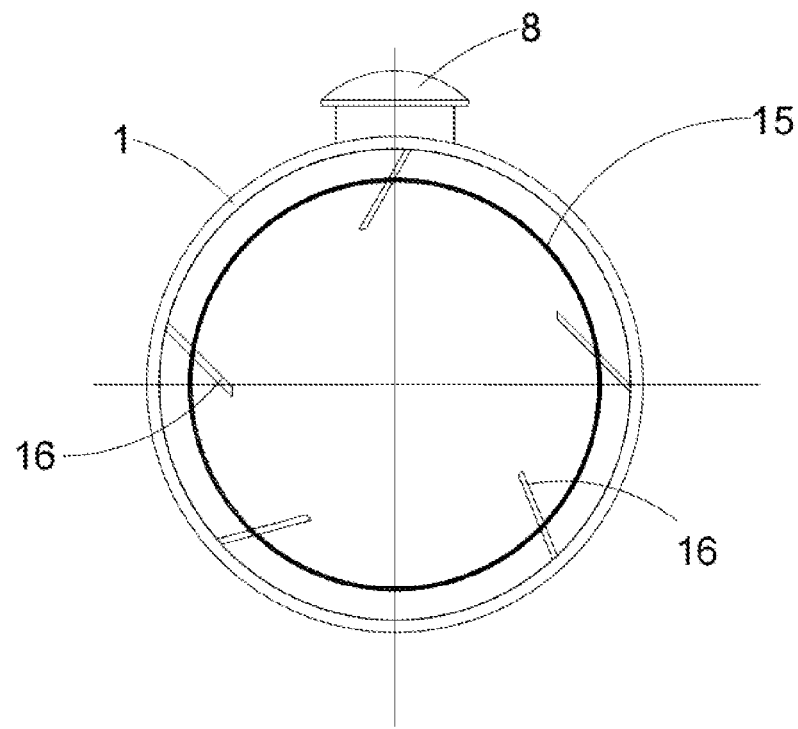
FIG. 6 is a diagram of a cross section of a cleaning roller.
Figure 10:
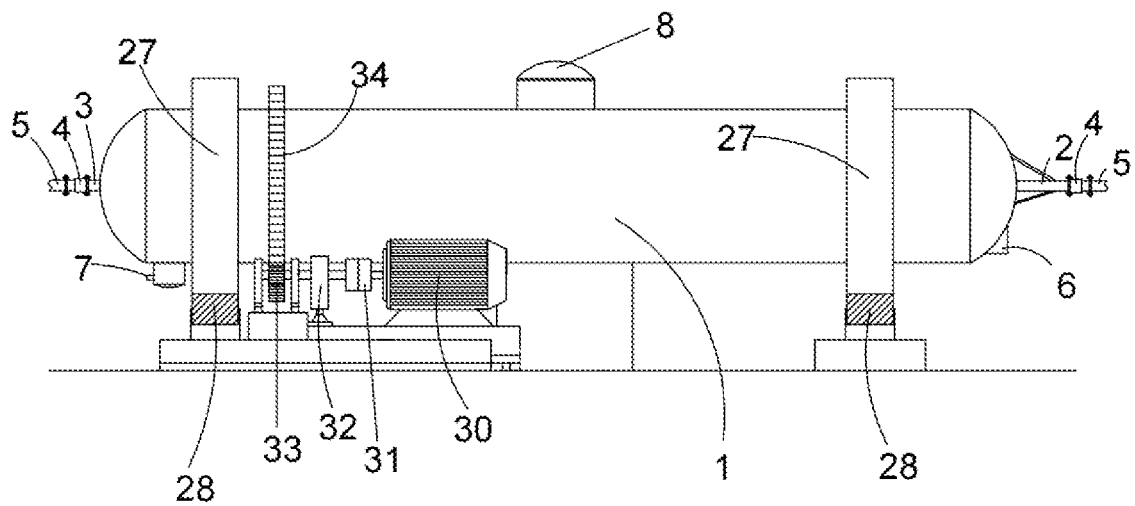
FIG. 10 is a side diagram of a cleaning roller device of the present disclosure.
Figure 11:
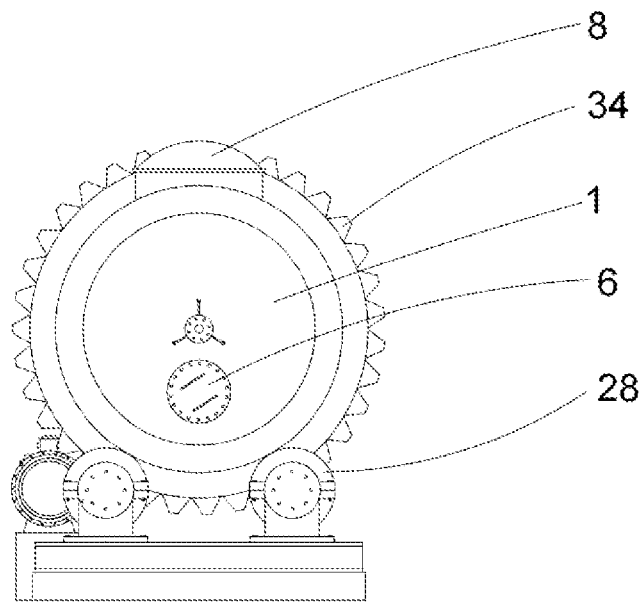
FIG. 11 is a diagram of the front end of the cleaning roller device of the present disclosure.

A cleaning roller device of the present disclosure is as shown in FIG. 6, FIG. 10 and FIG. 11, which is used as a main component of a barreled viscous colloidal hazardous waste treatment and recovery system to separate viscous colloidal hazardous waste from shredded material barrel fragments and to homogenize the viscous colloidal hazardous waste into a liquid chemical raw material. The cleaning roller device comprises a transversely-arranged cleaning roller 1, a roller bearing device, and a roller driving device capable of driving the cleaning roller 1 to rotate around the central axis thereof on the roller bearing device; a front-end central pipe 2 and a rear-end central pipe 3 are respectively arranged along the front-end central axis and the rear-end central axis of the cleaning roller 1 and are respectively connected to rotary joints 4, and the rotary joints 4 are used for respectively connecting external pipelines 5 communicated with a water source and a steam source; the front end of the cleaning roller 1 is provided with a solid barrel fragment outlet and a barrel fragment outlet sealing cover 6, the rear end of the cleaning roller 1 is provided with a liquid outlet 7; and a feed port is formed in the wall of the cleaning roller 1 and is provided with a feed port sealing cover 8.

As shown in FIG. 6, an inner-ring cylindrical filter plate 15 which is coaxial with the inner wall of the cleaning roller 1 is arranged in the cleaning roller 1, and drain holes are uniformly distributed in the inner-ring cylindrical filter plate 15. The length of the inner-ring cylindrical filter plate 15 is arranged along the whole length of the inner cavity of the cleaning roller 1, and a spacing distance of 80 mm-120 mm, preferably 100 mm, is reserved between the inner-ring cylindrical filter plate 15 and the inner wall of the cleaning roller 1.

As shown in 9, steel balls 49 are arranged in an annular space between the inner wall of the cleaning roller 1 and the inner-ring cylindrical filter plate 15, and the steel balls 49 can roll freely along the inner wall of the cleaning roller 1; when the cleaning roller 1 is a static state, the steel balls 49 fall into the bottom of the inner wall of the cleaning roller 1 and are arranged in rows along the length of the roller 1, and at least two rows of the steel balls 49 are provided; and when the cleaning roller 1 is a rotating state, a collision relationship is formed between two adjacent steel balls 49 between adjacent steel ball 49 rows. Preferably, 2 or 3 or 4 rows of steel balls 49 are provided.

As shown in FIG. 6, a wave making plate 16 is arranged at the inner wall of the cleaning roller 1, and the wave making plate 16 penetrates through the inner-ring cylindrical filter plate 15 from the inner wall of the cleaning roller 1 in the radius direction or the inclined direction to extend to the inner cavity. Three to eight wave making plates 16 are uniformly arranged along the circumferential direction of the inner wall of the cleaning roller 1 at intervals, with an extending length of 100 mm to 350 mm; and the lengths of the wave making plates 16 are arranged continuously or arranged at intervals along the whole length of the inner cavity of the cleaning roller 1.

As shown in FIG. 10 and FIG. 11, the roller bearing device is arranged as follows: at least two large supporting wheels 27 surrounding the outer wall of the roller are arranged at the outer wall of the roller at intervals, small supporting wheels 28 capable of supporting the large supporting wheel 27 are symmetrically arranged at both sides of each large supporting wheel 27, and each small supporting wheel 28 is supported by a pair of bearings 29 which are symmetrically fixed to the ground; and the roller driving device comprises a motor 30, a stop brake 31, a reduction gear box 32, a pinion 33, and a gear wheel 34 in turn; the gear wheel 34 is fixed to the outer wall of the barrel, and the pinion 33 is supported by a pair of bearings 29 symmetrically fixed to the ground.

Figure 3:
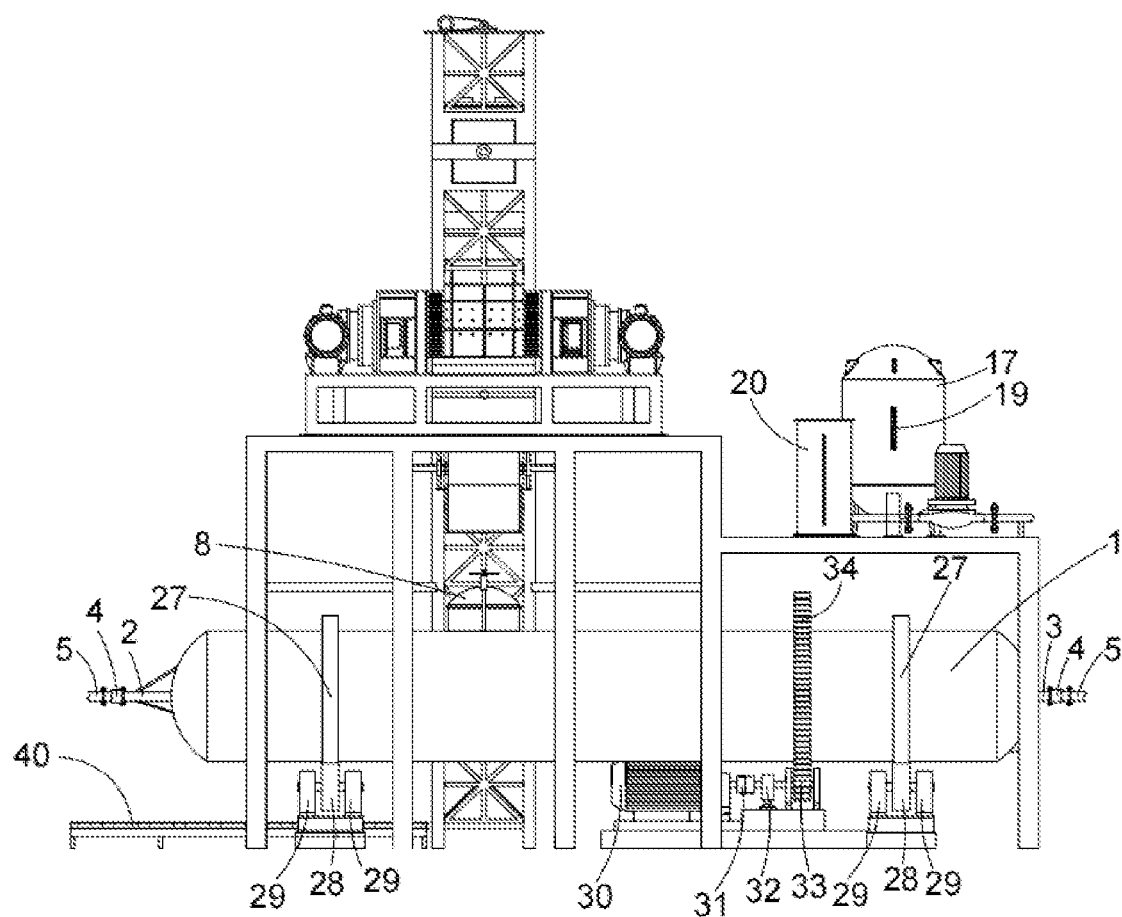
FIG. 3 is a diagram of the side face of a barreled viscous colloidal hazardous waste treatment and recovery system device taking a cleaning roller device of the present disclosure as a main component.
Figure 5:
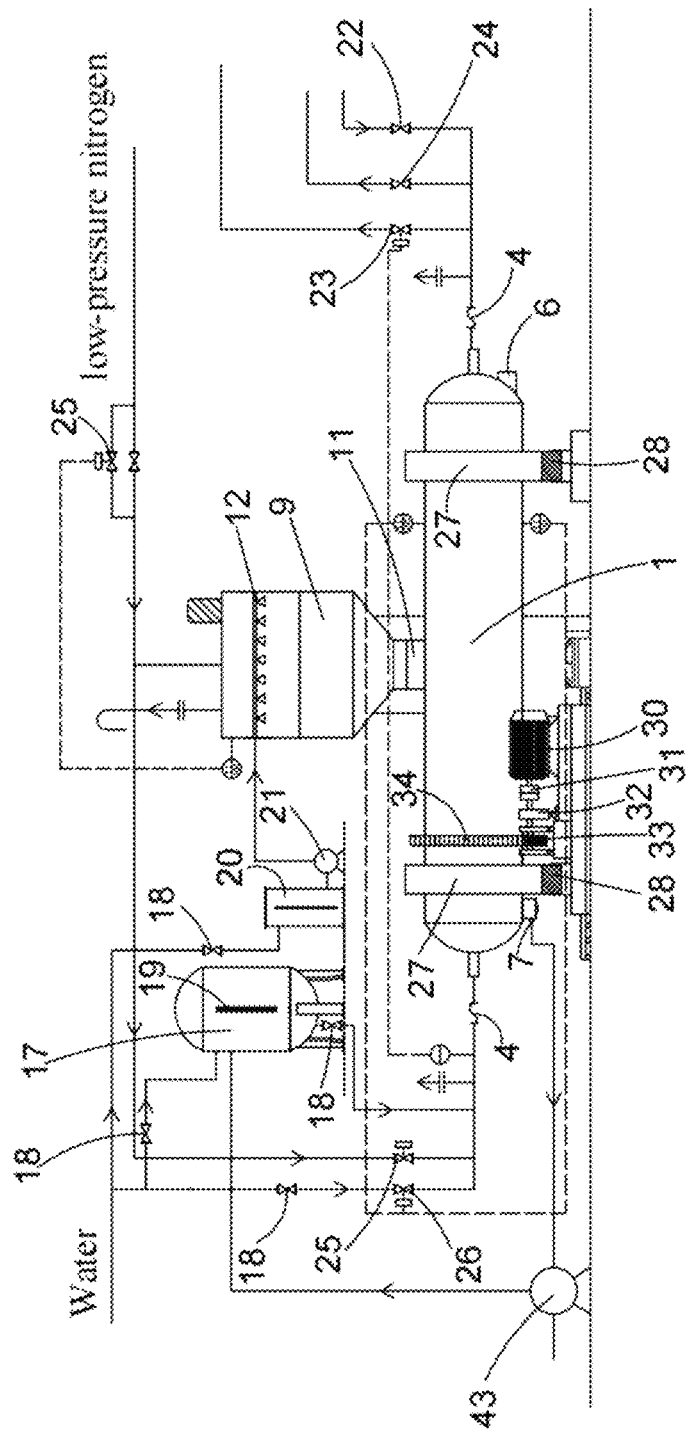
FIG. 5 is a diagram of the overall composition of a barreled viscous colloidal hazardous waste treatment and recovery system device taking a cleaning roller device of the present disclosure as a main component.
Figure 7:
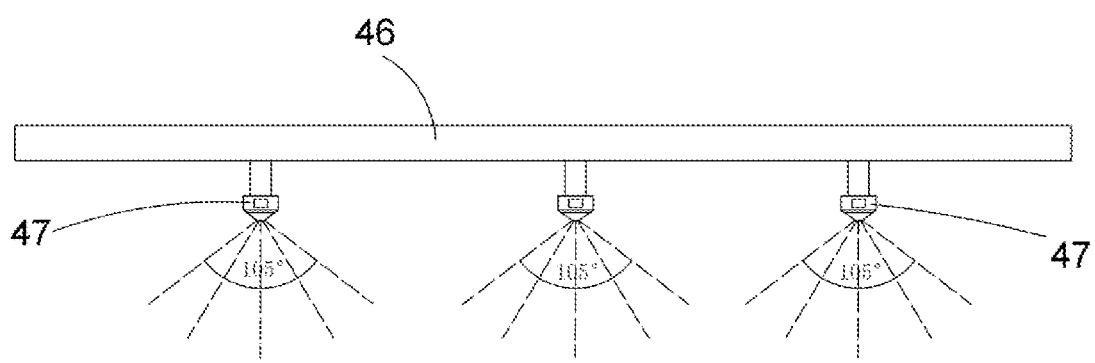
FIG. 7 is a diagram of a water mist spraying device.

The barreled viscous colloidal hazardous waste treatment and recovery system device taking the cleaning roller device of the present disclosure as the main component, as shown in FIG. 1, FIG. 3 or FIG. 5, can shred the material barrel 45, separate the viscous colloidal hazardous waste from the material barrel, and homogenize the viscous colloidal hazardous waste into the liquid chemical raw material. The barreled viscous colloidal hazardous waste treatment and recovery system device comprises a transversely-arranged cleaning roller 1, a roller bearing device, and a roller driving device capable of driving the cleaning roller 1 to rotate around the central axis thereof on the roller bearing device, a front-end central pipe 2 and a rear-end central pipe 3 are respectively arranged along the front-end central axis and the rear-end central axis of the cleaning roller 1 and are respectively connected to rotary joints 4, and the rotary joints 4 are used for respectively connecting external pipelines 5; the external pipelines 5 are respectively communicated with a water source and a steam source; the front end of the cleaning roller 1 is provided with a solid barrel fragment outlet and a barrel fragment outlet sealing cover 6, the rear end of the cleaning roller 1 is provided with a liquid outlet 7, and is provided with a liquid outlet valve. A feed port is formed in the wall of the cleaning roller 1, and a feed port sealing cover 8 is arranged at the feed port; a shredder 9 for shredding the material barrel 45 is arranged above the cleaning roller 1, and the shredder 9 comprises a barrel inlet 10; a detachable connecting pipe 11 is arranged between the shredder 9 and the feed port of the cleaning roller 1; and the detachable connecting pipe 11 may employ a telescopic connecting pipe. An inner cavity of the shredder 9 is communicated with a low-pressure nitrogen source, a water mist spraying device 12 is arranged above the inner cavity of the shredder 9, and the water inlet of the water mist spraying device 12 is connected to the water source. As shown in FIG. 7, the water mist spraying device 12 comprises a mounting top plate 46, a plurality of spray nozzles 47 are mounted below the mounting top plate 46, and each spray nozzle 47 has a spraying angle of 105 degrees. A material barrel lifting device 13 is arranged from the ground to the barrel inlet 10 of the shredder 9, and a barrel pushing device 14 is arranged at the position, at the barrel inlet 10 of the shredder 9, of the material barrel lifting device 13.

As shown in FIG. 6, an inner-ring cylindrical filter plate 15 which is coaxial with the inner wall of the cleaning roller 1 is arranged in the cleaning roller 1, the length of the inner-ring cylindrical filter plate 15 is arranged along the whole length of the inner cavity of the cleaning roller 1, a spacing distance of 80 mm to 120 mm is reserved between the inner-ring cylindrical filter plate 15 and the inner wall of the cleaning roller 1, and drain holes are uniformly distributed in the inner-ring cylindrical filter plate 15. Therefore, when the cleaning roller 1 rolls, the liquid can get in and out the inner-ring cylindrical filter plate 15 through the drain holes, while the material barrel fragments are always in a space surrounded by the inner-ring cylindrical filter plate 15 to be washed by the liquid continuously. The wave making plate 16 is arranged at the inner wall of the cleaning roller 1, three to eight wave making plates 16 are uniformly arranged along the circumferential direction of the inner wall of the cleaning roller 1 at intervals and extend out from the inner wall of the cleaning roller 1 along the radius direction or the inclined direction, with the extending length of 100 mm to 350 mm; and the lengths of the wave making plates 16 are arranged continuously or arranged at intervals along the whole length of the inner cavity of the cleaning roller 1. The providing of the wave making plate 16 can enhance the wave washing effect of the liquid in the cleaning roller 1, thus enhancing the washing effect of the material barrel fragments.

Figure 9:
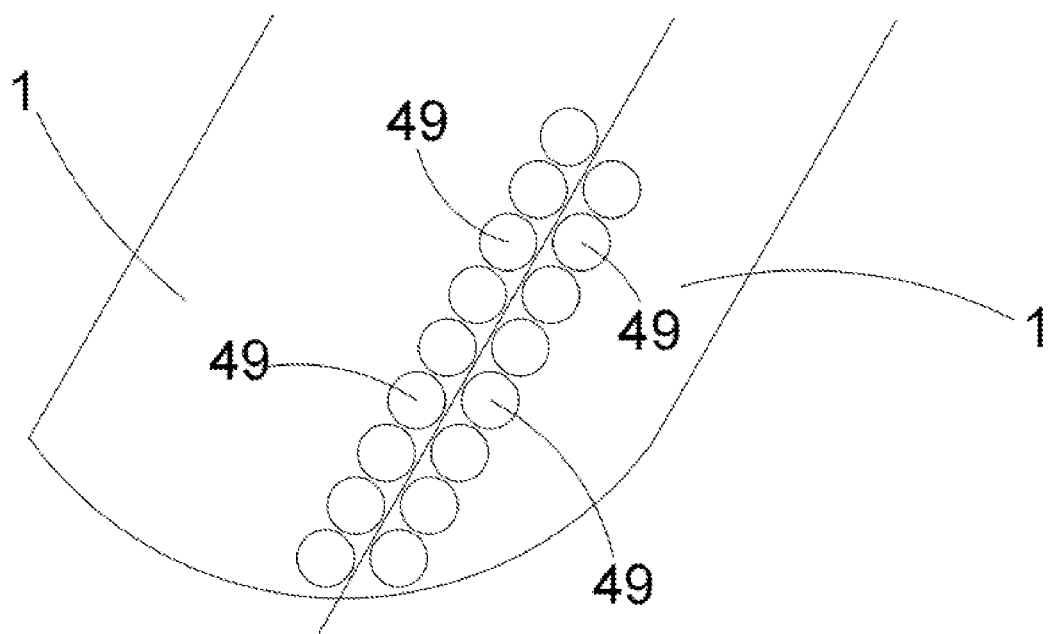
FIG. 9 is a diagram of an arrangement state of steel balls at the inner wall of the cleaning roller.

For most high-viscosity colloidal hazardous waste, above solution is enough to homogenize the hazardous waste into an ideal liquid chemical raw material. However, for some colloidal hazardous waste with extremely high viscosity, the above solution is not enough to homogenize the hazardous waste into the ideal liquid chemical raw material. To this end, the cleaning roller device, as the main component of the barreled viscous colloidal hazardous waste treatment and recovery system, may also be optimized and improved as follows: as shown in FIG. 9, steel balls 49 can also be arranged in an annular space between the inner wall of the cleaning roller 1 and the inner-ring cylindrical filter plate 15, and the steel balls 49 can roll freely along the inner wall of the cleaning roller 1. When the cleaning roller 1 is in a static state, the steel balls 49 fall into the bottom along the inner wall of the cleaning roller 1 and are arranged in rows along the length of the roller 1, and at least two rows of steel balls 49 are provided; when the cleaning roller 1 is in a rotating state, a collision relationship is formed between two adjacent steel balls 49 between two adjacent steel ball 49 rows. The situation that two rows of steel balls 49 are provided is shown in FIG. 9. In general, the steel balls 49 can be arranged to be two rows, thus forming a collision relationship between two adjacent steel balls 49 between the two steel ball 49 rows. The steel balls 49 may also be arranged to be three rows or four rows. The steel ball 49 may employ a solid-core steel ball with a diameter of 60 mm, and for the convenience, the steel ball may directly employ a solid-core steel ball used by a ball mill. Therefore, the colloidal hazardous waste with particularly high viscosity can also be thoroughly homogenized into an ideal liquid chemical raw material.

As shown in FIG. 3 or FIG. 5, a water gauge tank 17 is arranged above the cleaning roller 1, the gauge tank 17 comprises a water inlet end connected to a water source through a water valve 18 and a water inlet end connected to the rear-end central pipe 3 of the cleaning roller through the water valve 18, and the gauge tank 17 is provided with a water level gauge 19. A water channel 20 for water mist spraying is arranged above the cleaning roller 1, the water inlet end of the water channel 20 for water mist spraying is connected to the water source through the water valve 18, and a water outlet end of the water channel 20 for water mist spraying is connected to the water inlet end of the water mist spraying device 12 through the water pump 21.

As shown in FIG. 5, the external pipeline 5 at the front end of the cleaning roller 1 is connected to a steam source through a steam valve 22, is connected to an overpressure emptying port through an overpressure control valve 23, and is connected to a low-concentration tail gal outlet through a pressure relief valve 24. An inner cavity of a shredder 9 is communicated with a low-pressure nitrogen source through a nitrogen adding control valve 25, the external pipeline 5 at the rear end of the cleaning roller 1 is connected to the low-pressure nitrogen source through the nitrogen adding control valve 25, and is connected to the water source through the overtemperature control valve 26 and the water valve 18.

As shown in FIG. 3 and FIG. 5, the roller bearing device is arranged as follows: at least two large supporting wheels 27 surrounding the outer wall of the roller are arranged at the outer wall of the roller at intervals, small supporting wheels 28 capable of supporting the large supporting wheel 27 are symmetrically arranged at both sides of each large supporting wheel 27, and each small supporting wheel 28 is supported by a pair of bearings 29 which are symmetrically fixed to the ground; and the roller driving device comprises a motor 30, a stop brake 31, a reduction gear box 32, a pinion 33, and a gear wheel 34 in turn; the gear wheel 34 is fixed to the outer wall of the barrel, and the pinion 33 is supported by a pair of bearings 29 symmetrically fixed to the ground.

Figure 4:
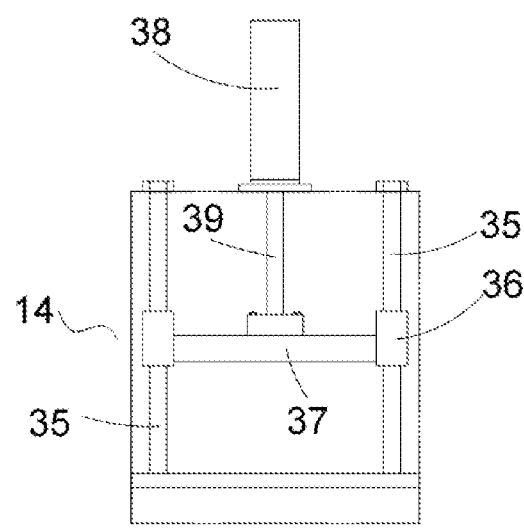
FIG. 4 is a diagram of a barrel pushing device.

As shown in FIG. 4, a barrel pushing device 14 comprises two guide pillars 35 which are fixedly arranged on the material barrel lifting device 13 and symmetrically distributed, two guide sleeves 36 sleeved on the guide pillars 35, a push plate 37 fixedly arranged between two guide sleeves 36, and a hydraulic cylinder 38 fixedly arranged on the material barrel lifting device 13; and a piston rod 39 of the hydraulic cylinder 38 is fixedly connected to the push plate 37.

Figure 8:
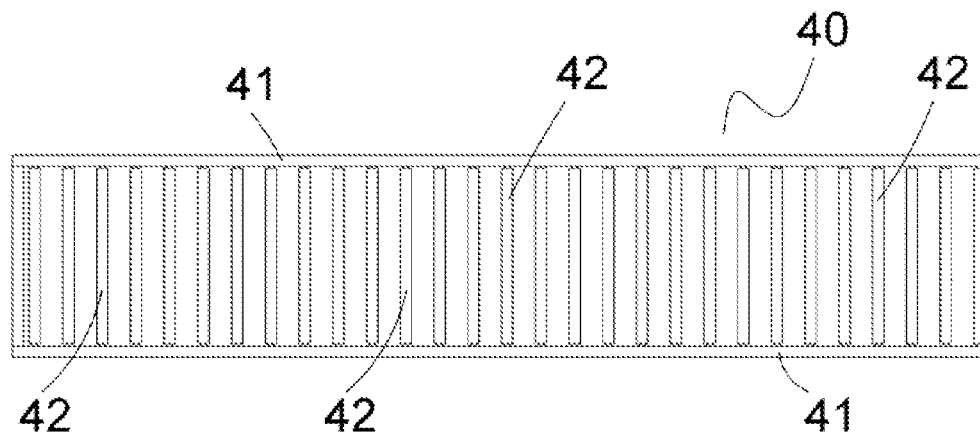
FIG. 8 is a diagram of a rolling conveying device.

As shown in FIG. 3, a rolling conveying device 40 for conveying the material barrel 45 is arranged in front of the material barrel lifting device 13. As shown in FIG. 8, the rolling conveying device 40 comprises two parallel steel rails 41 in parallel, and a plurality of rolling wheels 42 are sequentially arranged along the two parallel steel rails 41, and terminals of the two parallel steel rails 41 extend into the space below the material barrel lifting device 13.

Figure 2:
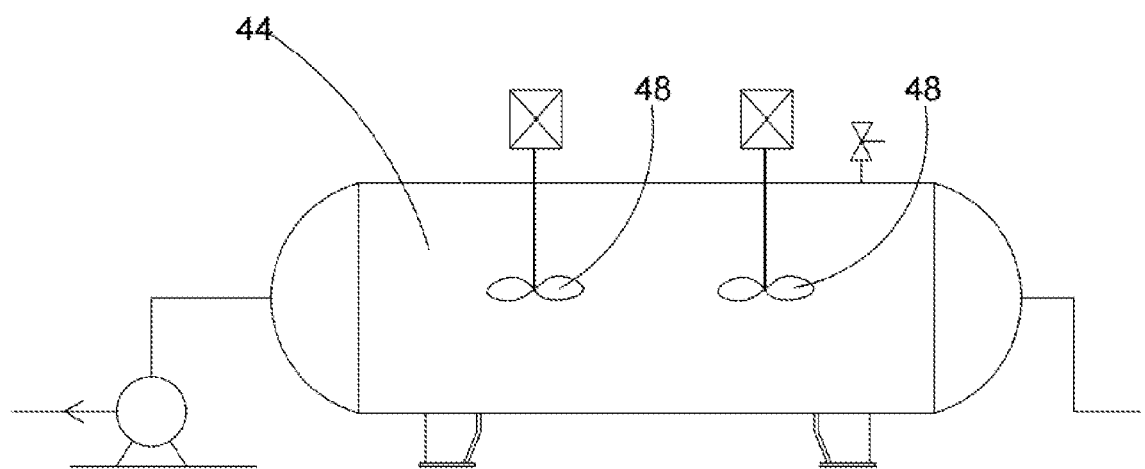
FIG. 2 is a diagram of a liquid storage tank.

As shown in FIG. 2 and FIG. 5, a liquid transfer pump 43 and a liquid storage tank 44 are arranged behind the cleaning roller 1, the liquid outlet 7 at the rear end of the cleaning roller 1 is provided with a connecting pipe, and the connecting pipe at the liquid outlet may employ a hose. The liquid outlet 7 at the rear end of the cleaning roller 1 may be connected to an inlet of the liquid transfer pump 43 through the connecting pipe, one outlet of the liquid transfer pump 43 is connected to the liquid storage tank 44, and the other outlet is connected to the inlet of the gauge tank 17. As shown in FIG. 2, a stirrer 48 is arranged in an inner cavity of the liquid storage tank 44, and two stirrers 48 are arranged in the inner cavity of the liquid storage tank 44 in parallel.

The material barrel 45 may employ a standard material barrel with the volume of 200 L. The inner cavity of the roller 1 has a diameter of 1,600 mm, a length of 10 m, and a volume of 20 $m^3$. The charging is calculated by 4.8 $m^3$ once, 16 barrels of hazardous waste can be cleaned and treated once; the cleaning time is calculated by 40 min once, and the cleaning waste water is calculated by 2.5 $m^3$ once. The cleaned material includes massive and viscous objects and is conveyed to the liquid storage tank 44 through the liquid transfer pump 43. The safety measures are as follows: 1, the water mist spraying device is additionally arranged at the top of the shredder; 2, a temperature sensor is additionally arranged at the top of the shredder, and when temperature rise excessively or combustion occurs, the nitrogen adding valve is automatically opened; 3, a liquid phase temperature detector and a gas phase temperature detector are respectively mounted on a washing bucket of the roller to detect the cleaning process of the roller; and when overtemperature occurs, the water adding valve is automatically opened for cooling; 4. an explosion-proof plate and an overpressure emptying valve are arranged at the two ends of the roller; 5, an exhaust valve and an exhaust pipe fitting are arranged at one end of the roller to exhaust harmful gas in the roller in time; and 6, a cleaning roller pressure detector is mounted at one end of the roller to detect the pressure in the washing drum, and an emptying valve is automatically opened for emptying and pressure relief when the pressure exceeds the set pressure.

The operation of the barreled viscous colloidal hazardous waste treatment and recovery system taking the cleaning roller device of the present disclosure as the main component comprises three stages of charging, cleaning, and discharging.

The charging stage comprises the following operation steps:
1. closing a liquid outlet valve of the liquid outlet 7 at the rear end of the cleaning roller 1, disconnecting the liquid outlet 7 from the configured connecting pipe, and sealing the barrel fragment outlet with the barrel fragment outlet sealing cover 6 at the front end of the cleaning roller 1.
2. Injecting water into the gauge tank 17 and the water channel 20 for water mist spraying to reach a set water level required for opening.
3. Confirming that the feed port of the cleaning roller 1 is in an upward position, opening the feed port sealing cover 8, butting the detachable connecting pipe 11 with the feed port of the cleaning roller 1, and opening a discharge gate valve of the shredder 9.
4. Opening the water valve 18, calculating the water quantity in a ratio that the hazardous waste:water is 1:0.5-1.1, and feeding water into the cleaning roller 1.
5. Turning on the water pump 21 to make the water mist spraying device 12 start working.
6. Starting the shredder 9, feeding material barrels 45 filled with the viscous colloidal hazardous waste to the material barrel lifting device 13 through the rolling conveying device 40 one by one in accordance with 16 barrels in each batch, lifting the material barrel to the height of the barrel inlet 10 of the shredder 9 by the material barrel lifting device 13, pushing the material barrel 45 into the shredder 9 by the barrel pushing device 14, shredding the material barrel 45 by the shredder 9 under the water mist spraying, thus enabling the hazardous waste and the material barrel fragments to enter the inner cavity of the cleaning roller 1 through the connecting pipe 11; and repeating the operation until 16 barrels of hazardous waste and the material barrel fragments all enter the inner cavity of the cleaning roller 1.
7. Turning off the shredder 9 and the water pump 21, disconnecting the detachable connecting pipe 11 from the feed port of the cleaning roller 1, closing the discharge gate valve of the shredder 9, and closing and locking the feed port sealing cover 8.

As the water injected into the gauge tank 17 is directly introduced into the cleaning roller 1 for cleaning, the waste water may be adopted; while the water injected into the water channel 20 for water mist spraying is used for spraying, clean tap water should be employed for preventing the spray nozzle 47 from being blocked.

The cleaning stage comprises the following operation steps:
8. starting the motor 30 to drive the cleaning roller 1 to rotate around the central axis thereof on the roller bearing device, adjusting the frequency conversion of the motor 30 to a set rotating speed, introducing steam to heat to 70° C. in the cleaning process, and cleaning for about 30 minutes.
9. Adjusting the frequency conversion of the motor 30 to reduce the rotating speed, starting the stop brake 31 when the feed port of the cleaning roller 1 is in an upward position, thus making the feed port of the cleaning roller 1 be in the upward position capable of being in butt joint with the detachable connecting pipe 11.

The discharging stage comprises the following operation steps:
10. slowly opening the overpressure control valve 23 to release the pressure in the cleaning roller 1, connecting the liquid outlet 7 at the rear end of the cleaning roller 1 to the inlet of the liquid transfer pump 43 by the connecting pipe, conveying the homogenized liquid chemical raw material in the cleaning roller 1 to the liquid storage tank 44, and starting the stirrer 48 for stirring when the liquid level in the liquid storage tank 44 is greater than one third; and then pumping the liquid chemical raw material in the liquid storage tank 44 to a chemical production system.
11. After the liquid chemical raw material in the cleaning roller 1 is completely pumped out, closing the liquid conveying pump 43 and the liquid outlet valve, and disconnecting the connecting pipe.
12. Opening the barrel fragment outlet sealing cover 6 at the front end of the cleaning roller 1, and pulling out and packaging the material barrel fragments.

In addition, in the step 12, whether the material barrel fragments are completely cleaned or not should be checked first after opening the barrel fragment outlet sealing cover 6 at the front end of the cleaning roller 1; in a case that the material barrel fragments have been completely cleaned, the material barrel fragments can be pulled out and packaged. In a case that the material barrel fragments have not been completely cleaned, about 1 $m^3$ of water can be added into the cleaning roller 1 to repeat the steps 8 and 9 for cleaning again, the cleaning time can be properly shortened, and the bathing water in the cleaning roller 1 after repeated cleaning is conveyed to the gauge tank 17 through the liquid transfer pump 43 to be used as the bathing water for next cleaning.

Personnel co-configuration and productivity calculation: the barreled viscous colloidal hazardous waste treatment and recovery system device taking the cleaning roller device disclosed by the present disclosure as a main component is relatively high in automation degree, and only 2 to 3 skilled operators need to be configured in one work shift; one working cycle is divided into three stages of charging, cleaning and discharging, and each stage takes about 0.5 hour; and one working cycle is about 1.5 hours, and can be conducted for five times in one work shift. The working efficiency is high, in a case that 4 $m^3$ of viscous colloidal hazardous waste can be treated in once charge, 20 $m^3$ of viscous colloidal hazardous waste can be treated in one work shift.

The left, right, front, back, and other orientations in the document of the present disclosure are only relative to the representation of the drawings of the specification of the present disclosure for ease of expression, and are not meant to limit the present disclosure.

What is claimed is:

1. A cleaning roller device mounted on a ground, which is used as a main component of a barreled viscous colloidal hazardous waste treatment and recovery system to separate viscous colloidal hazardous waste from shredded material barrel fragments and to homogenize the viscous colloidal hazardous waste into a liquid chemical raw material, wherein the cleaning roller device comprises a cleaning roller (1) arranged parallel to the ground, a roller bearing device, and a roller driving device capable of driving the cleaning roller (1) to rotate around the central axis of the cleaning roller on the roller bearing device, wherein a front-end central pipe (2) and a rear-end central pipe (3) are respectively arranged along a central axis of a front-end and a central axis of a rear-end of the cleaning roller (1) and are respectively connected to rotary joints (4), and the rotary joints (4) are used for respectively connecting external pipelines communicated with a water source and a steam source;

a feed port is formed in a wall of the cleaning roller (1) and is provided with a feed port sealing cover (8); and the front end of the cleaning roller (1) is provided with a solid barrel fragment outlet and a barrel fragment outlet sealing cover (6), the rear end of the cleaning roller (1) is provided with a liquid outlet (7).

2. The cleaning roller device according to claim 1, wherein an inner-ring cylindrical filter plate (15) which is coaxial with an inner surface of the wall of the cleaning roller (1) is arranged in the cleaning roller (1), and drain holes are uniformly distributed in the inner-ring cylindrical filter plate (15).

3. The cleaning roller device according to claim 2, wherein the length of the inner-ring cylindrical filter plate (15) is arranged along the whole length of an inner cavity of the cleaning roller (1), and a spacing distance of 80-120 mm is reserved between the inner-ring cylindrical filter plate (15) and the inner wall of the cleaning roller (1).

4. The cleaning roller device according to claim 2, wherein steel balls (49) are arranged in an annular space between the inner wall of the cleaning roller (1) and the inner-ring cylindrical filter plate (15), and the steel balls (49) can roll freely along the inner wall of the cleaning roller (1);

when the cleaning roller (1) is in a static state, the steel balls (49) fall into the bottom of the inner wall of the cleaning roller (1) and are arranged in rows along the length of the roller (1), and at least two rows of the steel balls (49) are provided; and when the cleaning roller (1) is in a rotating state, a collision relationship is formed between two adjacent steel balls (49) between adjacent steel ball (49) rows.

5. The cleaning roller device according to claim 2, wherein two rows or three rows or four rows of steel balls (49) are provided.

6. The cleaning roller device according to claim 2, wherein a wave making plate (16) is arranged on the inner wall of the cleaning roller (1) and penetrates through the inner-ring cylindrical filter plate (15) from the inner wall of the cleaning roller (1) in the radius direction or the inclined direction to extend to an inner cavity.

7. The cleaning roller device according to claim 6, wherein three to eight wave making plates (16) are uniformly arranged along the circumferential direction of the inner wall of the cleaning roller (1) at intervals, with the extending length of 100 mm to 350 mm; and the lengths of the wave making plates (16) are arranged continuously or arranged at intervals along the whole length of the inner cavity of the cleaning roller (1).

8. The cleaning roller device according to claim 1, wherein the roller bearing device is arranged as follows: at least two large supporting wheels (27) surrounding an outer surface of the wall of the cleaning roller are arranged at the outer wall of the cleaning roller at intervals, small supporting wheels (28) capable of supporting the large supporting wheel (27) are symmetrically arranged at both sides of each large supporting wheel (27), each small supporting wheel (28) is supported by a pair of bearings 29 which are symmetrically fixed to the ground; and the roller driving device comprises a motor (30), a stop brake (31), a reduction gearbox (32), a pinion (33), and a gear wheel (34) in turn, wherein the gear wheel (34) is fixed to the outer wall of the barrel, and the pinion (33) is supported by a pair of bearings (29) symmetrically fixed to the ground.

* * * * *